United States Patent
Mattsson et al.

(10) Patent No.: US 8,818,347 B2
(45) Date of Patent: Aug. 26, 2014

(54) NODE AND METHOD FOR SERVICE SPECIFIC MANAGEMENT

(75) Inventors: Ulf Mattsson, Kungsbacka (SE); Victor Manuel Avila Gonzalez, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/545,024

(22) Filed: Jul. 10, 2012

(65) Prior Publication Data

US 2014/0018063 A1  Jan. 16, 2014

(51) Int. Cl.
*H04M 3/00* (2006.01)
(52) U.S. Cl.
USPC ........... 455/418; 455/414.1; 455/423; 705/35
(58) Field of Classification Search
CPC ..................... H04W 24/00; H04W 29/08108; H04W 8/245; G06Q 30/0206
USPC .......................... 455/423, 418, 414.1; 705/35
See application file for complete search history.

(56) References Cited

U.S. PATENT DOCUMENTS

| | | | |
|---|---|---|---|
| 8,015,253 B1 * | 9/2011 | Zapata et al. | 709/206 |
| 2004/0148237 A1 * | 7/2004 | Bittmann et al. | 705/35 |
| 2007/0143853 A1 * | 6/2007 | Tsukamoto | 726/26 |
| 2010/0281102 A1 * | 11/2010 | Chinta et al. | 709/203 |
| 2011/0065419 A1 * | 3/2011 | Book et al. | 455/411 |
| 2012/0084438 A1 * | 4/2012 | Raleigh et al. | 709/224 |
| 2012/0101952 A1 * | 4/2012 | Raleigh et al. | 705/304 |
| 2012/0167162 A1 * | 6/2012 | Raleigh et al. | 726/1 |

* cited by examiner

*Primary Examiner* — Danh Le
(74) *Attorney, Agent, or Firm* — Rothwell, Figg, Ernst & Manbeck, P.C.

(57) ABSTRACT

Example embodiments are presented herein service session management based on service specific data and a user subscription. Some example embodiments may comprise a user equipment, and corresponding method therein, for monitoring an internet or network access by an identified application. Upon detection, the user equipment may be configured to send service specific data associated with the identified application to an enhanced application server. The enhanced application server may manage a service session based on the service specific data and the user subscription. The management of the service session may allow for a differentiated delivery of service for certain applications.

28 Claims, 5 Drawing Sheets

NODE AND METHOD FOR SERVICE SPECIFIC MANAGEMENT

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Policy and Charging Control (PCC) was originally introduced in 3GPP standards as a mean to secure resources in the access network mainly for dynamic services (such as IMS), but also to control resource consumption for regular Internet services (P2P-traffic, web-browsing, FTP etc) and to enable Flow Based Charging (FBC).

Although the original goal with PCC has since long time been completed in 3GPP, there is still a lot of activities ongoing in standards enhancing the PCC framework with add-ons. The new functions amended to the PCC architecture have shifted the role of the PCRF from something that was originally just a requirement for IMS into a more fundamental system element.

SUMMARY

A need exists for operators to be able to have the capabilities to reach agreements with service provides (e.g., of OTT services) in order to provide a different service delivery compared to competitors. Current systems do not provide an efficient way of differentiating services. Thus, at least one object of some of the example embodiments provided herein is to provide such a system and method for service differentiation in an accurate and efficient manner. This type of service delivery may have the example advantage of providing a better quality of service with differentiated charging and quality of service requirements. Another example advantage is the ability to accurately monitor all outgoing and incoming traffic associated with an identified application. A further example advantage is that the example embodiments present a scalable method of service differentiation. Another example advantage is load reduction on gateway nodes as there is no longer a need to perform heuristic detection.

Thus, some of the example embodiments may be directed towards a method, in a user equipment, for providing service specific data for service session management. The method comprises monitoring an identified application. The method also comprises detecting a start of the identified application, where the identified application utilizes an internet or network during operation. The method further comprises sending service specific data associated with the identified application to an enhanced application server for service session management.

Some of the example embodiments may be directed towards a user equipment configured to provide service specific data for service session management. The user equipment comprises processing circuitry configured to monitor an identified application. The processing circuitry is further configured to detect a start of said identified application, where the identified application utilizes an internet or network during operation. The user equipment further comprises radio circuitry configured to send service specific data associated with the identified application to an enhanced application server for service session management.

Some of the example embodiments may be directed towards a method, in an enhanced application server, for service session management of an identified application. The method comprises receiving, from a user equipment, service specific data associated with an identified application. The method also comprises managing a service session of the identified application based on the service specific data and a user subscription.

Some of the example embodiments may be directed towards an enhanced application server configured to provide service session management of an identified application. The enhanced application server comprises processing circuitry configured to receive, from a user equipment, service specific data associated with an identified application. The processing circuitry is further configured to manage a service session of the identified application based on the service specific data and a user subscription.

Some of the example embodiments may comprise a computer readable medium having instructions for causing a computer to execute a method comprising receiving, from a user equipment, service specific data associated with an identified application. The method also comprises managing a service session of the identified application based on the service specific data and a user subscription.

Some of the example embodiments may comprise a computer readable medium having instructions for causing a computer to execute a method comprising monitoring an identified application. The method also comprises detecting a start of said identified application, the identified application utilizing an internet or network during operation. The method further comprises sending service specific data associated with the identified application to an enhanced application server for service session management.

DEFINITIONS

3GPP Third Generation Partnership Project
API Application Programming Interface
APN Access Point Name
BSC Base Station Controller
CAN Connectivity Access Network
CCR Credit Control Request
EPC Evolved Packet Core
E-UTRAN Evolved UTRAN
FBC Flow Based Charging
FW Firmware
GERAN GSM Edge Radio Access Network
GPRS General Packet Radio Service
GSM Global System for Mobile Communications
HSS Home Subscriber Server
IMS IP Multimedia Subsystem
IMSI International Mobile Subscriber Identity
IP Internet Protocol
LTE Long Term Evolution
MME Mobility Management Entity
OS Operating System
OTT Over The Top
P2P Peer to Peer
PCC Policy and Charging Control
PCRF Policy and Charging Rules Function
PDN Packet Data Network
PGW PDN Gateway
QoS Quality of Service
RAN Radio Access Network
RBS Radio Base Station
RNC Radio Network Controller
Rx Receiver
SGSN Serving GPRS Support Node
SGW Serving Gateway
UE User Equipment
UMTS Universal Mobile Telecommunications System
UTRAN UMTS Terrestrial Radio Access Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
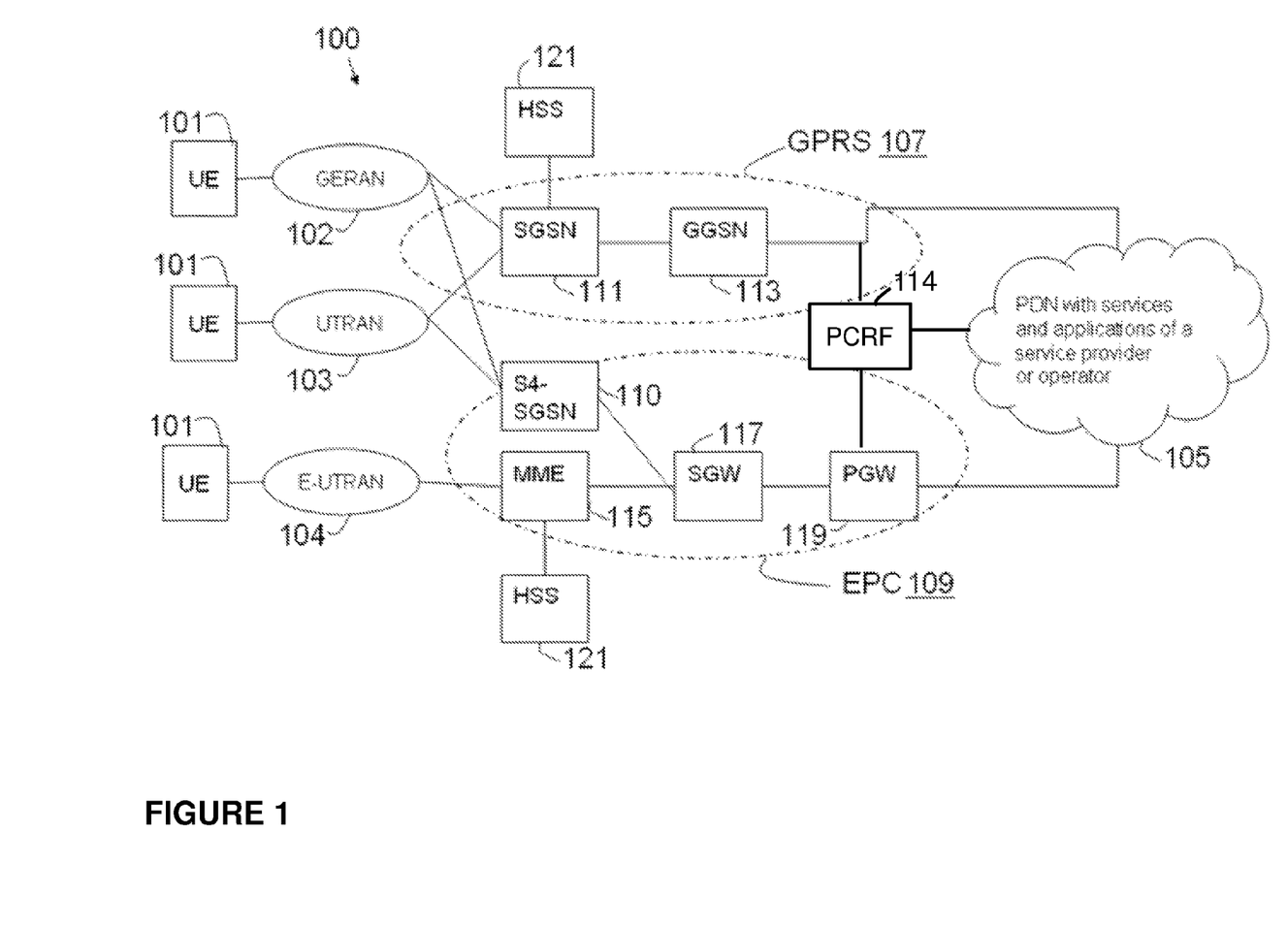
FIG. 1 is an example illustration of a wireless network.

In order to provide a better explanation of the example embodiments presented herein, a problem will first be identified and discussed. FIG. 1 provides an example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the operator or application server 105.

The EPC subsystem 109 may comprise a Mobility Management Entity 115, which may be responsible for idle mode UE tracking, paging procedures, and attachment and activation processes. The EPC subsystem may also comprise a Serving Gateway (SGW) 117, which may be responsible for the routing and forwarding for data packets. The EPC subsystem may also include a Packet data network Gateway (PGW) 119, which may be responsible for providing connectivity from the user equipment 101 to the operator of application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

The network may further comprise a Policy and Charging Rules Function (PCRF) 114 which may be in communication with the GGSN 113, the PGW 119 and the application server 105. The PCRF 114 encompasses policy control decision and flow-based charging control functionalities.

Often operators have an interest in being able to have the capabilities of reaching agreements with service providers in order to provide a different service delivery compared to competitors. Examples of such service providers may be providers of services which require network or internet access. Such a provide may be an Over The Top (OTT) service provider. An OTT service is a service which does not belong, or is not under the control, of the operator. Examples of such services may be Youtube™ or Skype™.

In providing a differentiated delivery of service, traffic associated with the service should be identified. One current method of such traffic identification is utilizing a different APN per application that requires a special service delivery. There are several problems with this approach. First, a terminal must be configured to use a different APN per application. This is not feasible if different QoS or charging requirements are to be applied to different subscribers. Furthermore, the use of multiple APNs requires multiple PDN connections and therefore multiple IPs. Thus, such a solution is not scalable.

Another example of a current traffic identification technique is the use of an Rx interface from the application server to the operator PCRF. The main drawback to this solution is that this implies that all application servers should be connected with all the PCRFs of all operators they have an agreement with. It should be noted that there may be hundreds of application servers for a single application. This solution is extremely costly to deploy.

Another example of a current traffic identification technique is the use of deep packet inspection. In many cases, the traffic needs to be identified through heuristics as the protocol is not public. This is, by definition, not accurate and therefore not very suitable if there is a commercial agreement. On the other hand, the service might change clients and protocol quite often, making the detection useless until a new signature has been delivered.

Thus, example embodiments are presented herein which enhance the communication between a user equipment and the network for identified applications. Such identification of the applications may be provided in an efficient and accurate manner. According to some of the example embodiments, traffic, associated with an application identified to receive a differentiated service, may be identified through the use of an entity or application (referred to herein as an enhanced application) which may reside on the user equipment. The enhanced application may monitor when the identified application initiates a communication on the network. Once the initiation occurs, the enhanced application may send information regarding the session to a server or node in the network. The server or node which receives such information will be referred to herein as an enhanced application server. The transmitted information may be used for enhanced traffic detection according to some of the example embodiments. Once the traffic has been identified on the core network, it may be treated in a differentiated way. It should be appreciated that the enhanced application server may comprise the same functionality as the application server 105 of FIG. 1, and therefore has been assigned the same reference numeral.

Table A below illustrates a messaging sequence, according to some of the example embodiments. The different messages illustrated in Table A will be addressed according to their corresponding line number. It should be appreciated that Table A is merely an example implementation and any other implementation or messaging within the scope of the example embodiments may be applied.

According to some of the example embodiments, the user equipment may first send an IP-CAN session establishment message to a gateway node (line 1). It should be appreciated that the term gateway node may comprise a PGW, SGW, SGSN, GGSN, etc. The gateway node may thereafter send a Gx CCR (INITIAL_REQUEST) message to the PCRF featuring the example information elements listed in Table A (line 2). The PCRF may thereafter select a profile for the user and decide which services or programs should be monitored or the identity of the enhanced application (line 3). The PCRF may thereafter send a Gx CCA message to the gateway node featuring the identity of services or programs which are to be monitored and/or the identity of the enhanced application (line 4). It should be appreciated that Table A provides that such programs are OTT programs, however, the example embodiments may be applied to any program or service which utilizes the internet or network. Thereafter, the gateway node may send a session response message to the user equipment (line 5).

Once a start of the enhanced application is detected (line 6) the user equipment may send an application or authentication request to the gateway node (line 7). The gateway node may insert identifying information in the request (line 8). The gateway node may further forward the request to the application server (line 9). The application server may authenticate the request and/or the authenticity of the enhanced application (line 10) and send results of the authentication to the gateway node (line 11). The gateway node may insert the services or applications to be monitored based on ADC rules which may be downloaded (line 12). The gateway node may thereafter send an application or authentication response to the user equipment (line 13).

Thereafter, the enhanced application may begin to monitor the services or applications which have been identified by the gateway, PCRF, and/or application server (line 14). The user equipment and/or enhanced application will thereafter detect once the identified service or application starts (or makes an internet or network access) (line 15-16). The user equipment and/or enhanced application will thereafter send an application request message to the gateway node indicating that the identified or monitored service/application has started (lined 17). According to some of the example embodiments, the request may comprise information elements such as various identifiers and a 5-tuple, as shown in Table A. It should be appreciated that any other information element may also be comprised in the response.

TABLE A

The gateway node may then map the service or application with predefined ADC rules (line 18) and create filters for the corresponding predefined ADC rule out of the received 5-tuple (line 19). Thus, filters for detecting the traffic associated with the identified application/service may be provided. By using the 5-tuple information, the traffic may be more accurately detected. It should be appreciated that the use of the 5-tuple information is provided as an example. Any other form of identifying information may be utilized to provide more accurate traffic detection filters.

Upon the creation of the filters, the gateway node may send an application request to the application server (line 20). The user equipment may also start sending payload information to the gateway node (line 21). With the use of the newly established filters, the gateway node may start to filter and identify the traffic associated with the identified application (line 22). The gateway node may thereafter send a report to the PCRF on such detection (line 23). Thereafter, the PCRF may select appropriate QoS and charging parameters for the user and identified service or application (line 24). The PCRF may thereafter send the selected parameters to the gateway node (line 25) which will enforce such parameters (line 26), thus providing the differentiated service for the traffic associated with the identified application.

Table B, provided below, illustrates yet another example messaging diagram incorporating the example embodiments presented herein. As shown in Table B, the user equipment, gateway node, and PCRF may utilize similar establishment methods as illustrated in lines 1-9 of Table A (lines 1-9). However, one difference with the example embodiment illustrated in Table B is that it is the application server, not the PCRF, which selects the applications or services to be monitored (line 10). Once the application server selects the services or applications to be monitored, the application server may send a query message to the PCRF (line 11). The PCRF may thereafter send a query response with the applications which may be monitored (line 12). Thereafter, the application server may send an authentication message to the user equipment with a list of services or applications which should be monitored (line 13).

Thereafter, the user equipment or enhanced application may monitor and detect an internet or network access attempt by the identified application, in a similar manner as was performed in Table A (lines 14-16). Once a detection has been made, the user equipment or enhanced application may send a notification to the application server (line 17). The notification may comprise various information elements providing information to assist in enhanced traffic detection. It should be appreciated that the information elements in Table B are provided merely for the purpose of explanation. Any other information element may also be utilized.

The application server may inform the PCRF of the detection by sending a request message which may feature the provided information elements (lines 18-19). The PCRF may send an acknowledge message to the application server and select appropriate QoS and charging parameters for the detected and identified application or service (lines 20-21). The PCRF may thereafter send a request with dynamic PCC rules to the gateway node and the gateway node may thereafter send an acknowledgement (lines 22-23). The gateway node may thereafter install the PCC and selected QoS and charging policies, thereby providing differentiated service for the identified application or service.

The example embodiments of Table A and Table B illustrate an application server which is a separate network entity. It should be appreciated that the functionality of the application server may also be included in the gateway node, the PCRF, or any other network node.

Figure 2:
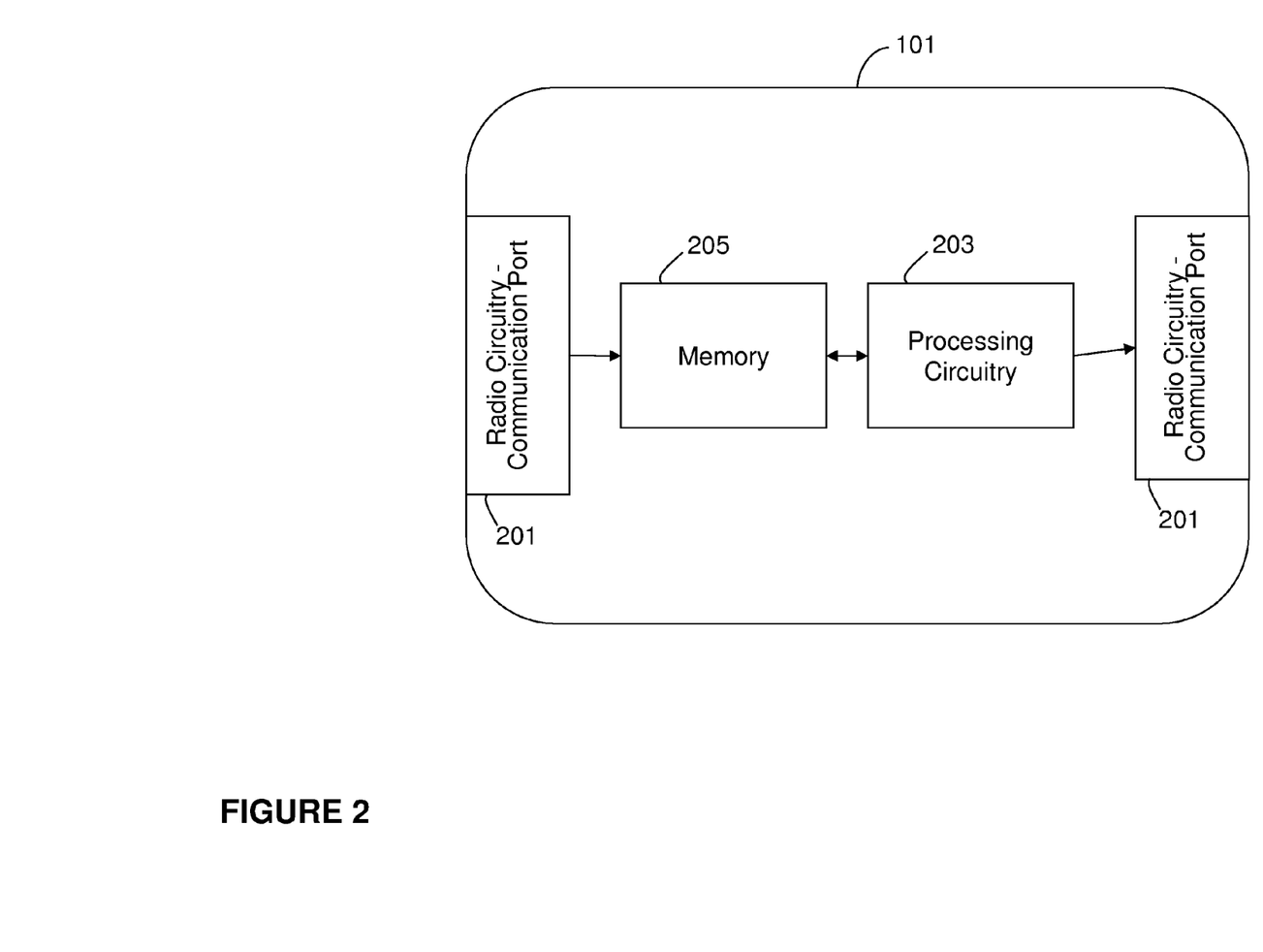
FIG. 2 is an example node configuration of a user equipment, according to some of the example embodiments.

FIG. 2 illustrates an example node configuration of a user equipment 101, which may be configured to utilize some of the example embodiments disclosed herein. The user equipment 101 may comprise radio circuitry or a communication port 201 that may be configured to receive and/or transmit communication data, instructions, and/or messages. It should be appreciated that the radio circuitry or communication port 201 may be comprised as any number of transceiving, receiving, and/or transmitting units or circuitry. It should further be appreciated that the radio circuitry or communication 201 may be in the form of any input/output communications port known in the art. The radio circuitry or communication 201 may comprise RF circuitry and baseband processing circuitry (not shown).

The user equipment 101 may also comprise a processing unit or circuitry 203 which may be configured to monitor an identified application and detect a usage of the identified application. The processing circuitry 203 may be any suitable type of computation unit, e.g. a microprocessor, digital signal processor (DSP), field programmable gate array (FPGA), or application specific integrated circuit (ASIC), or any other form of circuitry. The user equipment 101 may further comprise a memory unit or circuitry 205 which may be any suitable type of computer readable memory and may be of volatile and/or non-volatile type. The memory 205 may be configured to store received, transmitted, and/or measured data, device parameters, communication priorities, and/or executable program instructions.

TABLE B

TABLE B-continued

It should further be appreciated that the user equipment may comprise an enhanced application that may be configured to execute any of the example embodiments presented herein. It should further be appreciated that the enhanced application may be configured to run on any form of circuitry or computer readable medium.

Figure 3:
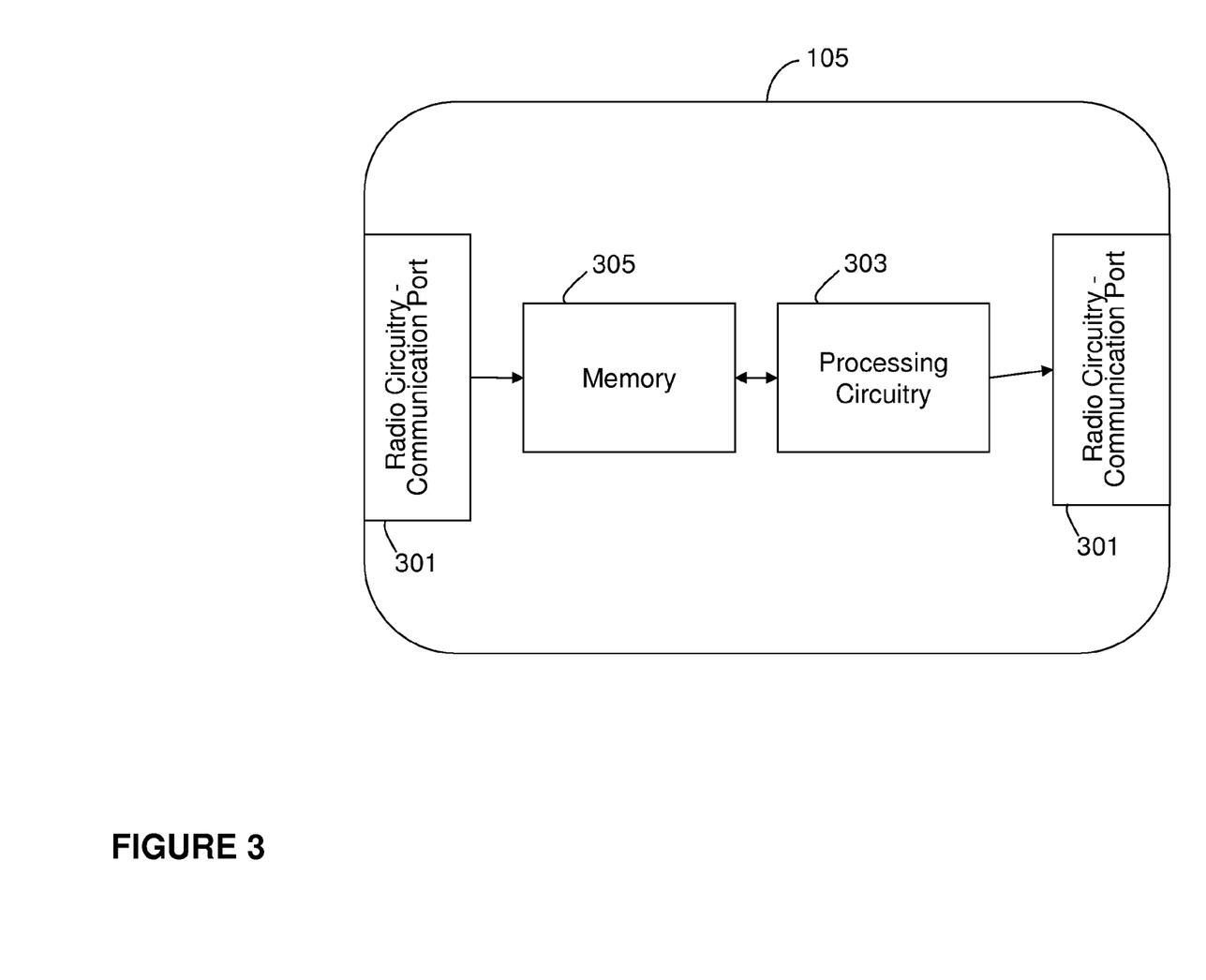
FIG. 3 is an example node configuration of an application server, according to some of the example embodiments.

FIG. 3 illustrates an example node configuration of an application server 105, which may be configured to utilize some of the example embodiments described herein. It should be appreciated that the enhanced application server may be located anywhere within the core network. Example locations of the enhanced application server may be within the PCRF or anywhere within an operator's network.

The application server 105 may comprise radio circuitry or a communication port 301 that may be configured to receive and/or transmit communication data, instructions, and/or messages. It should be appreciated that the radio circuitry or communication port 301 may be comprised as any number of transceiving, receiving, and/or transmitting units or circuitry. It should further be appreciated that the radio circuitry or communication 301 may be in the form of any input/output communications port known in the art. The radio circuitry or communication 301 may comprise RF circuitry and baseband processing circuitry (not shown).

The application server 105 may also comprise processing circuitry 303 which may be configured to receive any form of data and manage a service session based on service specific data and a user subscription. The processing circuitry 303 may be any suitable type of computation unit, e.g. a microprocessor, digital signal processor (DSP), field programmable gate array (FPGA), or application specific integrated circuit (ASIC), or any other form of circuitry. The application server 105 may further comprise a memory unit or circuitry 305 which may be any suitable type of computer readable memory and may be of volatile and/or non-volatile type. The memory 305 may be configured to store received, transmitted, and/or measured data, device parameters, communication priorities, and/or executable program instructions. It should be appreciated that the application server 105 may comprise a computer readable medium configured to execute any of the example embodiments presented herein.

Figure 4:
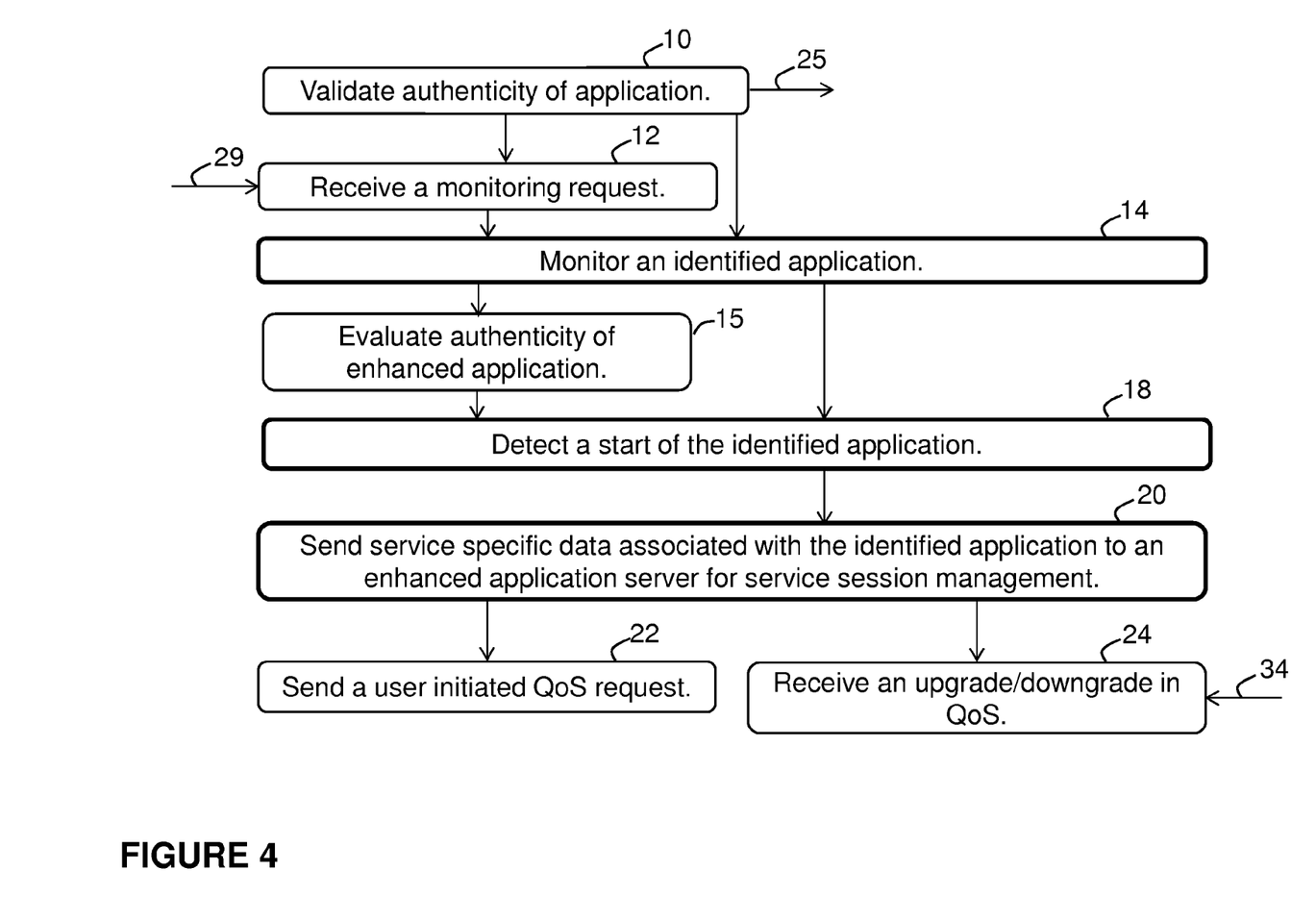
FIG. 4 is a flow diagram depicting example operations that may be taken by the user equipment of FIG. 2.

FIG. 4 is a flow diagram depicting example operations which may be taken by the user equipment 101 of FIG. 2 in the providing of service specific data for service session management. It should also be appreciated that FIG. 4 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 10

According to some of the example embodiments, the user equipment 101 may be configured to validate 10 an authenticity of an application which may be identified for monitoring. The processing circuitry 203 may be configured to validate the authenticity of the application which may be identified for monitoring. It should be appreciated that according to some of the example embodiments, the validating may be performed with the use of a hash algorithm.

It should be appreciated that any other form of validation known in the art (e.g., password, licensing information, running executable code) may also be utilized. It should also be appreciated that the identity of the application whose authenticity is to be validated may be provided by the enhanced application server or any other network entity. It should also be appreciated that the validation 10 may be provided as a result of a user or application initiated request. It should also be appreciated that the user equipment 101 may be further configured to send results of the validation to the enhanced application server. The radio circuitry 201 may be configured to send the results of the validation to the enhanced application server. Such sending is further described in FIG. 5 in relation to example operation 25.

Example Operation 12

According to some of the example embodiments, the user equipment 101 may be configured to receive 12, from an enhanced application server 105, a monitoring request. The monitoring request may comprise the identity of at least one application to be monitored. The radio circuitry 201 may be configured to receive, from the enhanced application server, the monitoring request. This example operation will be further described in relation to example operation 29 of FIG. 5.

Operation 14

The user equipment 101 is configured to monitor 14 the identified application. The processing circuitry 203 is configured to monitor the identified application. According to some of the example embodiments, the identified application may be a non-operator provided or controlled application. According to some of the example embodiments, the identified application may be an OTT application.

According to some of the example embodiments, the monitoring may be performed with the use of an enhanced application which may reside within the user equipment 101. According to some of the example embodiments, the enhanced application may be comprised in the user equipment as part of an initial configuration. According to some of the example embodiments, the enhanced application may be downloadable. According to some of the example embodiments, the enhanced application may be configured as part of the identified application. According to some of the example embodiments, the enhanced application may be updated whenever a vender of an application wants to participate in receiving the differentiated service. According to some of the example embodiments, the enhanced application may be comprised in the API, OS, and/or OTA.

Example Operation 15

The user equipment 101 may be configured to evaluate 15 an authenticity of the enhanced application. The processing circuitry 203 may be configured to evaluate the authenticity of the enhanced application. According to some of the example embodiments, the evaluation may be provided with the use of licensing and/or password information. It should be appreciated that any form of authenticity evaluation known in the art may be utilized. According to some of the example embodiments, the user equipment 101 may be further configured to send results of the authenticity to the enhanced application server. The radio circuitry 201 may be configured to send the results.

Operation 18

The user equipment 101 is further configured to detect 18 an internet of network access from the identified application. The processing circuitry 203 is configured to detect an internet of network access from the identified application.

According to some of the example embodiments, the detecting may be performed with the use of an enhanced application which may reside within the user equipment 101. According to some of the example embodiments, the enhanced application may be comprised in the user equipment as part of an initial configuration. According to some of the example embodiments, the enhanced application may be downloadable. According to some of the example embodiments, the enhanced application may be configured as part of the identified application. According to some of the example embodiments, the enhanced application may be updated whenever a vender of an application wants to participate in receiving the differentiated service. According to some of the example embodiments, the enhanced application may be comprised in the API, OS, and/or in FW below the OS.

Operation 20

The user equipment 101 is also configured to send 20 service specific data associated with the identified application to the enhanced application server for service session management. The radio circuitry 201 is configured to send the service specific data associated with the identified application to the enhanced application server for service session management.

According to some of the example embodiments, the service specific data comprises data utilized for application traffic detection. According to some of the example embodiments, the service specific data comprises 5-tuple information associated with the identified application. According to some of the example embodiments, the service specific data comprises a type of service or application of the identified application.

Example Operation 22

According to some of the example embodiments, the sending 20 may further comprise sending 22, to the enhanced application server 105, a user initiated quality of service request. The radio circuitry 201 may be configured to send, to the enhanced application server 105, the user initiated quality of service request. According to some of the example embodiments, during the operation of the identified application, a user may be presented with an option to receive an increased quality of service, for example, for an additional cost. If the use chooses such an option, the request may be sent directly to the enhanced application server for processing.

Example Operation 24

According to some of the example embodiments, the user equipment 101 may be configured to receive 24, from the enhanced application server 105, an upgrade or downgrade of a quality of service during an operation of the identified application based on the service specific data and/or a user subscription. This example operation will be further described in relation to example operation 34 of FIG. 5.

Figure 5:
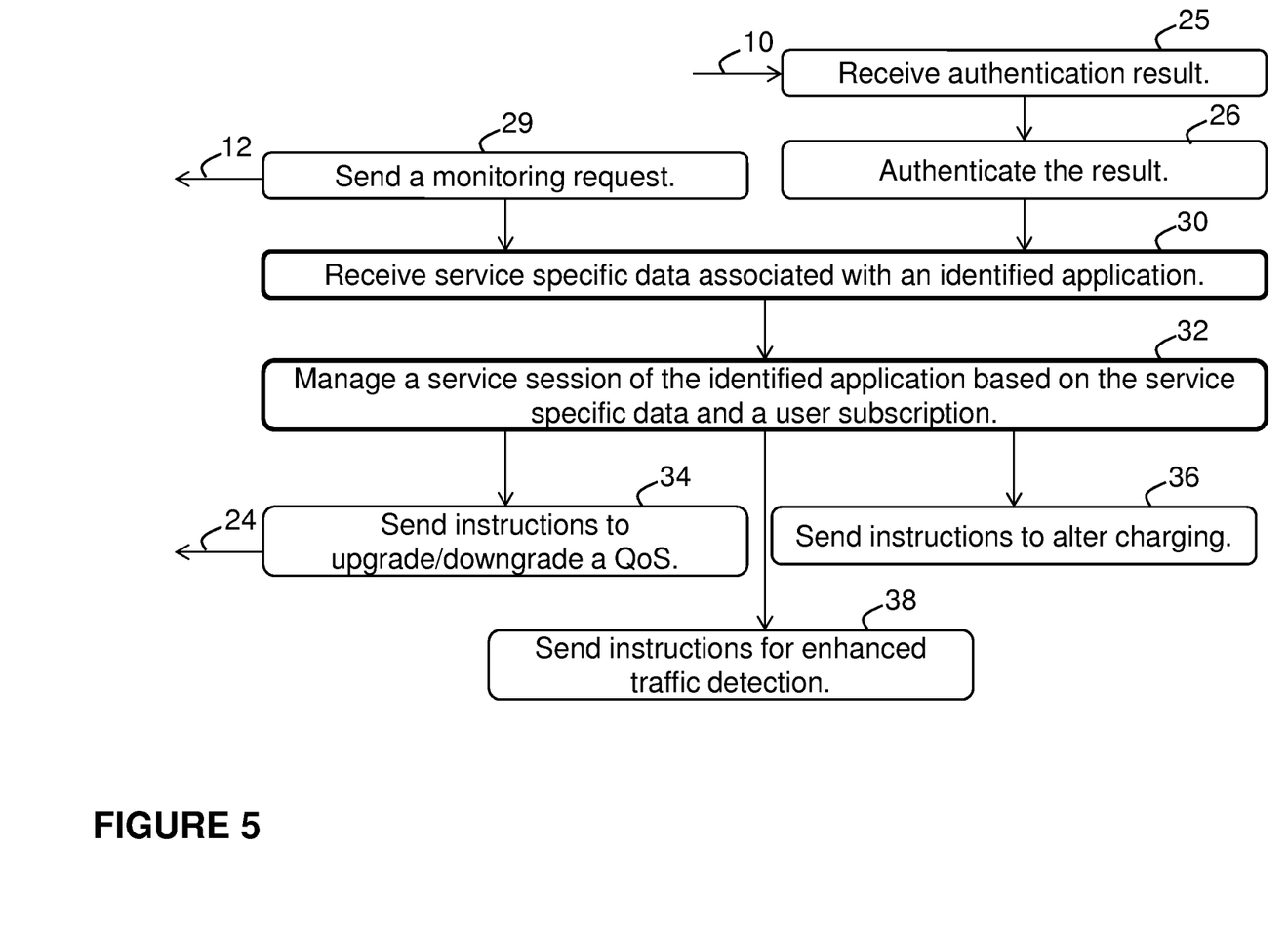
FIG. 5 is a flow diagram depicting example operations that may be taken by the application server of FIG. 3.

FIG. 5 is a flow diagram depicting example operations which may be taken by the enhanced application server 105 of FIG. 3 in the providing of service specific data for service session management. It should also be appreciated that FIG. 5 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 25

According to some of the example embodiments, the enhanced application server 105 may be configured to receive 25, to the user equipment 101, an authentication result. The authentication result may confirm an identity of a user equipment and/or enhanced application which is configured to receive a differentiated service. The processing circuitry 303 may be configured to receive the authentication result. The authentication result provided by the user equipment and/or enhanced application is further described in FIG. 4 in relation to example operation 10.

Example Operation 26

According to some of the example embodiments, the enhanced application server 105 may be configured to authenticate 28 the authentication result to verify the identified application is a correctly identified application. The processing circuitry 303 may be configured to authenticate the authentication result. According to some of the example embodiments, the authentication may comprise utilizing deep packet inspection and/or heuristics. It should be appreciated, according to some of the example embodiments, the authentication may be performed by the GGSN, SGSN, or PGW when instructed to do so by the enhanced application server.

Example Operation 29

According to some of the example embodiments, the enhanced application server 105 may be further configured to send 29, to the user equipment 101, a monitoring request. The monitoring request may comprise instructions to monitor the identified application. The monitoring request may also comprise identity information regarding the identified application. The processing circuitry 303 may be configured to send, to the user equipment 101, the monitoring request.

According to some of the example embodiments, the sending may performed upon detecting a change in a user subscription. According to some of the example embodiments, the sending may also be performed during a predetermined time period. For example, the enhanced application server may be configured to send a new monitoring request once a month. According to some of the example embodiments, the sending may also be performed upon receiving an activation request for the user equipment. For example, the user equipment itself may request the differentiated service. In such an event, the user equipment may send an activation request. The monitoring request is further described in FIG. 4 in relation to example operation 12.

Operation 30

The enhanced application server 105 is configured to receive 30, from the user equipment 101, service specific data associated with an identified application. The processing circuitry 303 is configured to receive, from the user equipment 101, the service specific data associated with the identified application.

According to some of the example embodiments, the service specific data comprises data utilized for application traffic detection. According to some of the example embodiments, the service specific data comprises 5-tuple information. According to some of the example embodiments, the service specific data comprises a type of service of application of the identified application. According to some of the example embodiments, the service specific data comprises a user initiated quality of service request.

Operation 32

The enhanced application server 105 is further configured to manage 32 a service session of the identified application based on the service specific data and a user subscription. The processing circuitry 303 is configured to manage the service session of the identified application based on the service specific data and the user subscription.

According to some of the example embodiments, the user subscription comprises predefined rules for an allowed quality of service based on use conditions. According to some of the example embodiments, the use conditions may be related to a time, date, length and/or location of a use of the identified application. Such predefined rules may be configured within the enhanced application server or may be retrieved from any other node in the network, for example the PCRF.

Example Operation 34

According to some of the example embodiments, the managing 32 may further comprise sending 34 instructions, to a network node, to upgrade or downgrade a quality of service of an operation of the identified application based on the service specific data and the user subscription. The processing circuitry 303 may be configured to send, to the network node, the instructions to upgrade or downgrade the quality of service of an operation of the identified application based on the service specific data and the user subscription. This operation is also described in relation to example operation 24 of FIG. 4. Examples of a network node, according to example operation 34 may be a gateway node (e.g., PGW, SGW, SGSN, GGSN) or the PCRF.

Example Operation 36

According to some of the example embodiments, the managing 32 may further comprise sending 36, to a network node, instructions to alter a charging for data packets belonging to the identified application. The processing circuitry 303 may be configured to send, to the network node, instructions to alter a charging for data packets belonging to the identified application. Examples of a network node, according to example operation 36 may be (e.g., PGW, SGW, SGSN, GGSN) or the PCRF.

Example Operation 38

According to some of the example embodiments, the managing 32 may further comprising sending 36, to a gateway node, instructions for enhanced traffic detection for traffic associated with the identified application based on the service specific data. The processing circuitry 303 may be configured to send, to the gateway node, instructions for enhanced traffic detection for traffic associated with the identified application based on the service specific data.

According to some of the example embodiments, the instructions for enhanced traffic detection may further comprise instructions for establishing a traffic filter based on the service specific data. According to some of the example embodiments, the instructions for enhanced traffic detection may further comprise instructions for providing deep packet inspection for data packets associated with the identified application. According to some of the example embodiments, the instructions for enhanced traffic detection may further comprise instructions for extracting a 5-tuple associated with the identified application via the deep packet inspection.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a user equipment, for providing service specific data for service session management, the method comprising:

monitoring, by the user equipment, an identified application;

detecting, by the user equipment, an internet or network access from said identified application; and thereafter sending, by the user equipment, service specific data associated with the identified application to an enhanced application server for service session management, by the enhanced application server, of a service session associated with the identified application based, at least in part, on the service specific data.

2. The method of claim 1, wherein the monitoring further comprises receiving, from the enhanced application server, a monitoring request, said monitoring request comprising the identity of at least one application to be monitored.

3. The method of claim 1, further comprising validating an authenticity of the identified application.

4. The method of claim 3, wherein the validating further comprises utilizing a hash algorithm.

5. The method of claim 1, wherein the service specific data comprises data utilized for application traffic detection.

6. The method of claim 5, wherein the service specific data comprises 5-tuple information associated with the identified application.

7. The method of claim 5, wherein the service specific data comprises a type of service or application.

8. The method of claim 1, wherein the sending further comprises sending, to the enhanced application server, a user initiated quality of service request.

9. The method of claim 1, further comprising receiving, from the enhanced application server, an upgrade or downgrade of a quality of service during an operation of the identified application based on the service specific data and/or a user subscription.

10. The method of claim 1, wherein the monitoring and/or detection are provided with an enhanced application within the user equipment.

11. The method of claim 10, further comprising:
evaluating an authenticity of the enhanced application; and
sending results of said authenticity to the enhanced application server.

12. The method of claim 11, wherein the evaluating further comprises evaluating licensing and/or password information.

13. The method of claim 10, wherein the enhanced application is a stand-alone application or is comprised in the identified application.

14. The method of claim 1, wherein the identified application is a non-operator provided application.

15. A user equipment, for providing service specific data for service session management, the user equipment comprising:

processing circuitry configured to monitor an identified application, wherein the processing circuitry is further configured to detect an internet or network access attempt from said identified application; and radio circuitry configured to send service specific data associated with the identified application to an enhanced application server for service session management, by the enhanced application server, of a service session associated with the identified application based, at least in part, on the service specific data.

16. The user equipment of claim 15, wherein the radio circuitry is further configured to receive, from the enhanced application server, a monitoring request, said monitoring request comprising the identity of at least one application to be monitored.

17. The user equipment of claim 16, wherein the processing circuitry is further configured to validate an authenticity of the identified application.

18. The user equipment of claim 17, wherein the processing circuitry is further configured to utilize a hash algorithm to validate the authenticity of the identified application.

19. The user equipment of claim 15, wherein the service specific data comprises data utilized for application traffic detection.

20. The user equipment of claim 19, wherein the service specific data comprises 5-tuple information.

21. The user equipment of claim 19, wherein the service specific data comprises a type of service or application.

22. The user equipment of claim 15, wherein the radio circuitry is further configured to send, to the enhanced application server, a user initiated quality of service request.

23. The user equipment of claim 15, wherein the radio circuitry is further configured to receive, from the enhanced application server, an upgrade or downgrade of a quality of service during an operation of the identified application based on the service specific data and/or a user subscription.

24. The user equipment of claim 15, wherein the processing circuitry is further configured to monitor and/or detect the identified application with the use of an enhanced application within the user equipment.

25. The user equipment of claim 24, wherein processing circuitry is further configured to evaluate an authenticity of the enhanced application and the radio circuitry is further configured to send results of the authenticity to the enhanced application server.

26. The user equipment of claim 25, wherein the processing circuitry is configured to evaluate the authenticity based on licensing and/or password information.

27. The user equipment of claim 24, wherein the enhanced application is a stand-alone application or is comprised in the identified application.

28. The user equipment of claim 15, wherein the identified application is a non-operator provided application.

* * * * *